(12) United States Patent
Hashmi et al.

(10) Patent No.: US 6,582,600 B1
(45) Date of Patent: Jun. 24, 2003

(54) TWO-STAGE HYDROCYCLONE SYSTEM

(75) Inventors: Khalid Hashmi, Edmonton (CA);
Hassan A. Hamza, Edmonton (CA);
Kanti Lal Kar, Calgary (CA)

(73) Assignee: Natural Resources Canada, Ottawa ( * ) Notice: Subject to any disclaimer, the term of this patent is extended or adjusted under 35 U.S.C. 154(b) by 0 days.

(21) Appl. No.: 10/059,301

(22) Filed: Jan. 31, 2002

(51) Int. Cl.$^7$ .......................... B01D 17/038; B04C 5/20
(52) U.S. Cl. ...................... 210/512.2; 209/729; 55/345
(58) Field of Search ........................ 210/512.1, 512.2; 209/719, 728, 729; 55/345, 459.1

(56) References Cited

U.S. PATENT DOCUMENTS

| | | | |
|---|---|---|---|
| 3,034,647 A | | 5/1962 | Giesse |
| 4,673,495 A | * | 6/1987 | Carroll et al. ............ 210/512.2 |
| 5,017,288 A | | 5/1991 | Thew et al. |
| 5,336,410 A | * | 8/1994 | O'Brien et al. .......... 210/512.2 |
| 5,667,687 A | * | 9/1997 | Lange ...................... 210/512.2 |
| 5,858,237 A | | 1/1999 | Hashmi et al. |

FOREIGN PATENT DOCUMENTS

| | | | | |
|---|---|---|---|---|
| EP | 0 313 197 | | 4/1989 | |
| GB | 465897 | | 5/1937 | |
| GB | 2 107 616 | | 5/1983 | |
| GB | 2136327 A | * | 9/1984 | ............. B04C/5/28 |
| WO | WO 91/14492 | | 10/1991 | |

* cited by examiner

*Primary Examiner*—David A. Reifsnyder

(57) ABSTRACT

A two-stage hydrocyclone system for separating oily fluids including a first stage hydrocyclone set up to produce a concentrated oil stream, while the second stage hydrocyclone is set up to optimize the production of clean water from the dirty water underflow stream of the first stage hydrocyclone. The hydrocyclone stages are mounted within a pressure vessel with divider walls, with the first stage producing a concentrated oil stream substantially free of water and a dirty water stream containing some oil. This dirty water stream from the first stage is fed to the second stage to obtain a clean water stream.

7 Claims, 2 Drawing Sheets

TWO-STAGE HYDROCYCLONE SYSTEM

BACKGROUND OF THE INVENTION

This invention relates to a cyclone separator. It relates more particularly to a two-stage hydrocyclone for separating immiscible fluids, e.g. fluids generated in the oil industry, such as produced water and high water-cut production fluids.

In heavy oil production, it is commonplace for fluids produced at the well head to contain in excess of 70% by volume of water, as well as varying amounts of suspended solids. In order to transport and process the oil and safely dispose of or recycle the water, it is necessary to separate these components in an efficient manner.

A variety of different cyclone separators have been developed for this purpose. For instance, Thew et al. U.S. Pat. No. 5,017,288 describes a cyclone separator for removing oil from water having a first cylindrical section followed by a pair of converging funnel shaped sections. The oil is removed through an overflow outlet at a closed end of the cylindrical section, while the water travels down the funnel shaped section.

In Coleman and Thew, U.K. Patent Application 2,107,616 published May 5, 1983, a similar type of hydrocyclone is described in which the overflow outlet includes a retractable plug for changing the size of the outlet.

Kuryluk U.S. Pat. No. 5,564,574 describes a separator for separating materials of different specific gravities, including materials of non-uniform size. That system employs a rotating agitator as a primary means of imparting rotational energy to the materials being processed. It also depends on separate injection of water and separate chambers for mixing and dilution.

A still further improvement to the design of hydrocyclones is provided in Hashmi et al. U.S. Pat. No. 5,828,237 and WO 98/48942, published Nov. 5, 1998.

Such hydrocyclones have proven to be highly effective in separately oily fluids. They are single stage hydrocyclones designed to produce two product streams: an overflow of concentrated oil and an underflow of clean water. However, because the optimum operating conditions for obtaining the two product streams are different, the quality of one of the two products must be compromised in the single-stage hydrocyclone system.

It is the object of the present invention to provide a further improved hydrocyclone system capable of providing two optimum product streams.

SUMMARY OF THE INVENTION

In accordance with the present invention, a hydrocyclone system has been developed which is capable of optimizing both product streams. This is achieved by way of a two-stage hydrocyclone system in which the first stage hydrocyclone is set up to produce a concentrated oil stream, while the second stage hydrocyclone is set up to optimize the production of clean water from the dirty water underflow stream of the first stage hydrocyclone.

The cyclone separator used in each stage is similar in type but may vary in size, e.g. the second stage may be smaller and of lower capacity than the first stage. Each stage comprises a generally cylindrical first portion or involute with an open end and a closed end, a generally axial overflow outlet in the closed end and at least two radially balanced feed ejection ports in the cylindrical first portion adjacent the closed end. A converging tapered second portion with open ends is axially flow connected to the open end of the cylindrical first portion and a converging tapered third portion with open ends is axially flow connected to the tapered second portion. A fourth generally cylindrical portion is axially flow connected to the tapered third portion. For operation within the present invention, the second stage cyclone separator has a longer cylindrical fourth portion than does the first stage.

The first and second stage hydrocyclones are mounted within a horizontally elongated pressure vessel comprising at least five chambers separated from each other by divider walls. These chambers include a feed inlet chamber, a concentrated oil overflow chamber, an underflow/feed chamber, a dirty water overflow chamber and a clean water underflow chamber.

The first stage hydrocyclone extends through a divider wall between the feed inlet chamber and the underflow/feed chamber. The axial overflow outlet of the first hydrocyclone flow connects to an opening in the divider wall between the feed inlet chamber and the concentrated oil overflow chamber and the downstream end of the fourth generally cylindrical portion of the hydrocyclone is positioned to flow into the underflow/feed chamber. This first hydrocyclone is arranged to pass through the axial overflow outlet a concentrated oil stream that is substantially free of water. A water stream containing some oil is collected in the underflow/feed chamber. This underflow/feed chamber also serves as the feed chamber for the second hydrocyclone stage.

The axial overflow outlet of the first cylindrical portion of the second stage hydrocyclone flow connects to an opening extending through the divider wall between the underflow/feed chamber and a dirty water overflow chamber. This second stage hydrocyclone is longer than the first stage hydrocyclone and extends through at least two divider walls with the outlet of the fourth generally cylindrical portion of the second stage hydrocyclone feeding into a clean water underflow chamber.

With the system of the present invention, it is possible to operate at a sufficiently high pressure such that the oil and water underflow from the first stage hydrocyclone has sufficient pressure to continue on its journey through the second stage hydrocyclone. While this is a preferred arrangement, it is also possible to use a booster pump to raise the pressure of the feed stream to the second hydrocyclone stage.

According to a preferred embodiment, both the first stage and second stage hydrocyclones pass through an intermediate chamber containing a heated fluid for heating the material passing through the hydrocyclones. This reduces viscosity and enhances separation.

BRIEF DESCRIPTION OF THE DRAWINGS

A presently preferred embodiment of the two-stage hydrocyclone unit of the present invention is now described in conjunction with the accompanying drawings, in which:

Referring to FIGS. 1 and 2, a preferred embodiment of the two-stage hydrocyclone unit of the present invention consists of an elongated pressure vessel 10 divided into a series of compartments 10A, 10B, 10C, 10D, 10E and 10F by means of divider walls 11, 12, 13, 14 and 15. Mounted within the pressure vessel 10 are a first stage hydrocyclone 25A and a second stage hydrocyclone 25B. These first and second stage hydrocyclones are of the type described in U.S. Pat. No. 5,858,237. For the sake of simplification, only a single first stage hydrocyclone and a single second stage hydrocyclone are shown. However, it will be understood that preferably a plurality of both the first and second stage hydrocyclones are mounted within vessel 10.

Figure 1:
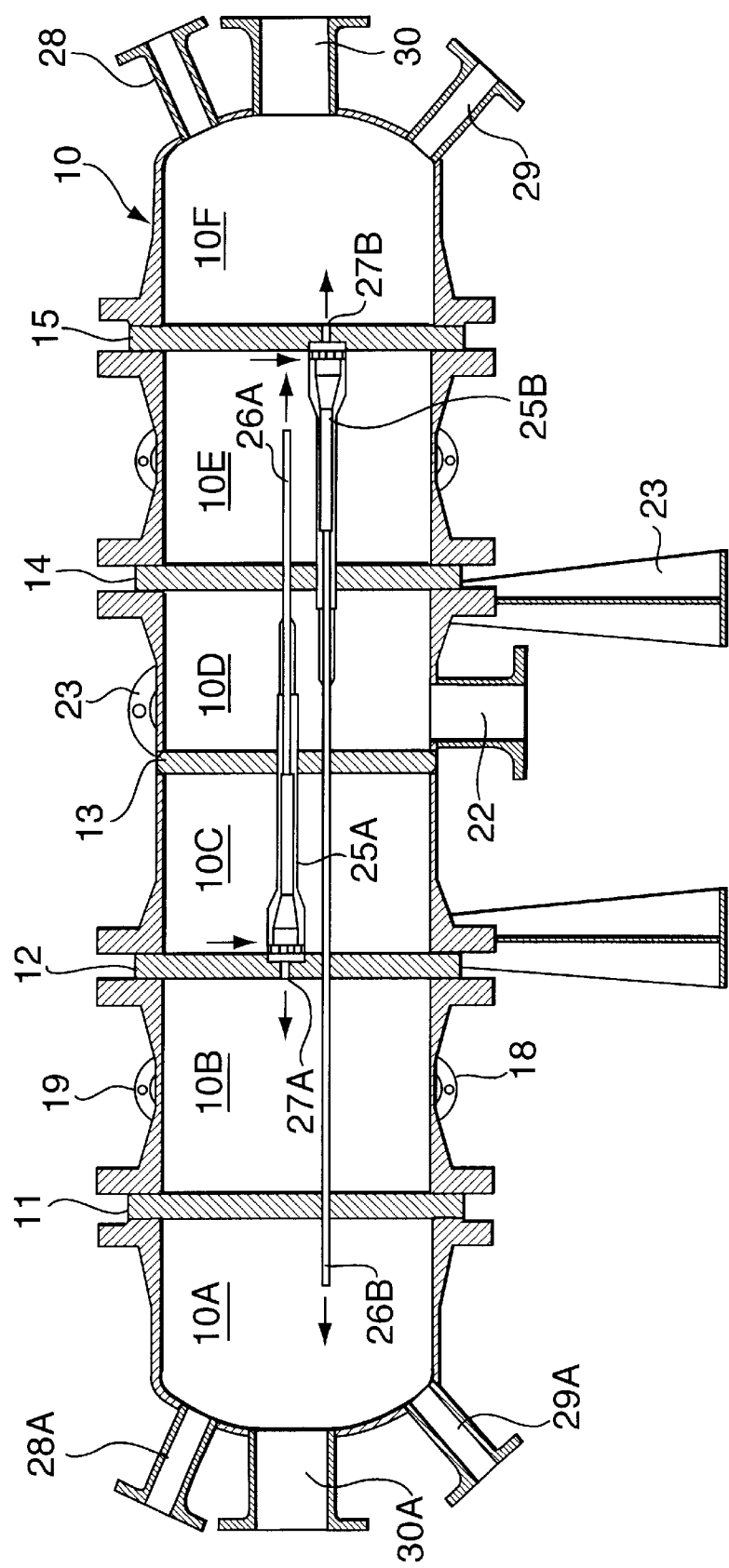
FIG. 1 is a cross-sectional view of a two-stage hydrocyclone unit according to the invention.
Figure 2:
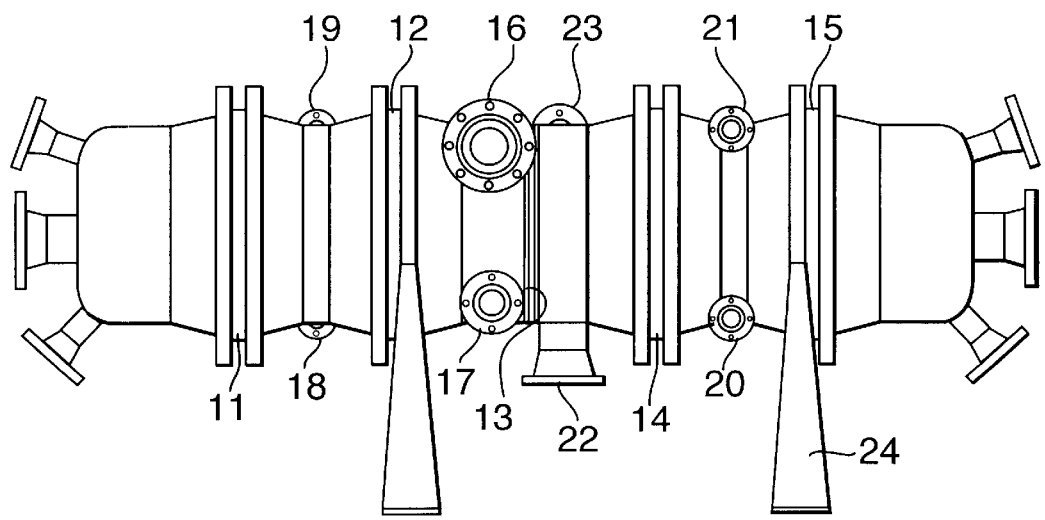
FIG. 2 is a side elevational view of the unit of FIG. 1.

The first stage hydrocyclone 25A is mounted within chambers 10C, 10D and 10E, passing through openings in divider walls 13 and 14. The involute end of the first stage hydrocyclone 25A is connected to divider wall 12 such that the overflow orifice aligns with an opening 27A in divider wall 12 thereby allowing the overflow from hydrocyclone 25A to enter chamber 10B. The underflow of first stage hydrocyclone 25A discharges into chamber 10E.

A fluid, e.g. oil and water, that is to be separated is fed into feed chamber 10C through a tangential inlet 16 at a raised pressure. The tangential flow gives the fluid additional tangential velocity for enhancing the generation of centrifugal force. The fluid then flows into the involute of the first stage hydrocyclone 25A. Within this hydrocyclone 25A an overflow stream of concentrated oil passes through opening 27A into concentrated oil overflow chamber 10B. A stream of water at reduced oil concentration is produced at the underflow outlet 26A and flows into underflow chamber 10E. It will be noted that the feed chamber 10C also includes an outlet 17 near the bottom for draining fluids during shutdown.

The concentrated oil collected in the overflow chamber 10B exits vessel 10 through an oil outlet 18. An inlet port 19 in this chamber is also provided for flushing the unit during shutdown.

The first stage underflow chamber 10E also serves as the feed chamber for the second stage hydrocyclone 25B. Thus, the underflow water with reduced oil content, still at significant pressure, is then fed directly to the involute of second stage hydrocyclone 25B. The overflow orifice of this second stage hydrocyclone 25B flow connects to an opening 27B in wall 15 whereby the second stage overflow discharges into chamber 10F it is noted that chamber 10E is also provided with an inlet portion 21 and an outlet port 20. If only a single stage treatment is desired, the underflow stream entering chamber 10E is simply discharged through outlet 20. An inlet port 21 is also provided in chamber 10E for flushing purposes or if additional oily fluid is to be treated by the second stage hydrocyclone.

When the second stage hydrocyclone is operated, the overflow stream exits from chamber 10F through outlet 30. This stream may be fed through a refining chain or may be recycled as feed to be reprocessed by the first stage hydrocyclone unit via external piping. In the latter case, the fluid is fed to a booster pump to attain the desired feed pressure. The chamber 10F is also provided with an inlet port 28 and an outlet port 29 for flushing during maintenance and shutdown.

The underflow stream 26B produced by the second stage hydrocyclone 25B is collected in the second stage underflow chamber 10A. This is a clean water stream that exits the vessel via outlet 30A to be reused in the processing chain or disposed of in an appropriate manner. This underflow chamber 10A is also equipped with an inlet port 28A and an outlet port 29A for flushing purposes during maintenance and shutdown.

The vessel 10 also preferably includes a heating chamber 10D. Hot fluid, such as water, is fed into this chamber via inlet port 23. The hot fluid comes into contact with the tapered section and straight extension of the hydrocyclone units in both stages to heat the fluid travelling inside the hydrocyclone body. This heating provides a positive effect on separation efficiency as the fluid viscosity is reduced with increased temperature. The heating fluid exits via the outlet port 22 at the bottom of the vessel and can be reused. It is also possible to use chamber 10D to contain a solids removal attachment such as that described in U.S. Pat. No. 5,858,237. In that case, the separated solids are carried out of the vessel by the heating fluid and is then collected in a downstream unit, such as a sludge tank.

Figure 3:
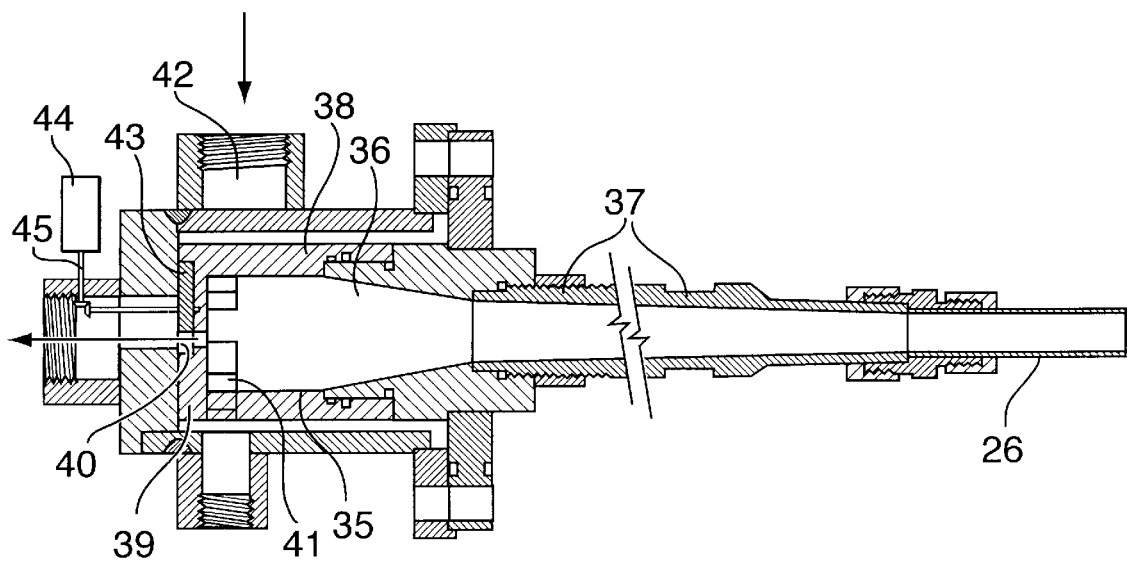
FIG. 3 is a cross-sectional view of one of the hydrocyclones.

The details of a preferred hydrocyclone for use in the present invention are described in FIG. 3. This hydrocyclone includes a generally cylindrical first portion or involute 35, a first tapered portion 36 axially aligned with section 36 and a tubular barrel 26 axially aligned with tapered section 37.

The involute 35 includes a body portion 38 with a closed end wall 39. An orifice 40 is located axially in the end wall 39. The involute section 35 also includes a plurality (2, 3 or 4) feed injection ports 41 which are tangentially mounted and equally spaced around the circumference of the involute section 35.

When a feedstock containing oil and water is fed through inlet 42 and injection ports 41, a rapidly rotating vortex is formed under low-shear conditions. The centrifugal forces generated by the vortex act differently on the denser (water) phase and the less-dense (oil) phase such that the oil phase is displaced toward the central axis of the cyclone and forms a reverse flow toward the overflow orifice 40. Because it has been found advantageous to be able to adjust the size of the orifice 40 depending on the nature of the feedstock to optimize separation, according to a preferred feature a system is provided for adjusting the effective orifice size. This is accomplished by means of a rotatable plate 43 having a plurality of orifices of different sizes. This plate 43 can be rotated either manually or by means of a power unit 44 via drive shafts 45. By this power means, any selected one of the orifices in rotatable plate 43 is brought into axial alignment with orifice 40 to thereby effectively change the diameter of orifice 40.

Since produced water has relatively low oil concentration, e.g. ppm levels to 1%, the objective for treating it is to obtain clean water with oil concentration of very low ppm level for reuse or disposal into injection wells. In the preferred embodiment of this invention, the first stage hydrocyclone is set up to produce a concentrated oil stream, while the second stage hydrocyclone is optimized to produce clean water from the dirty water underflow stream of the first stage hydrocyclone.

Produced water containing ppm levels of oil, e.g. 500 to 3000 ppm oil, is fed into the first stage feed chamber 10C typically at a pressure of about 100 to 140 psig. An oil-enriched overflow stream containing 5 to 15% by volume of oil is produced in chamber 10B, depending on the feed concentration. This product then rejoins the processing chain or may be fed into oil-concentrating hydrocyclones. The underflow stream, consisting of oily water, is collected in the first stage underflow chamber 10E at a reduced pressure of about 100 psig or lower. In the two stage operation, this oily water stream feeds into the second stage hydrocyclone 25B.

To remove as much oil as possible, the second stage unit is constructed using a long tubular extension 27 in order to increase residence time and effect separation at the lower feed pressure. Relatively large overflow orifices (3.0 to 3.5 mm) are used for the second stage hydrocyclone 25B to ensure that the bulk of the oil core is removed in the second stage overflow stream. As a result, clean water containing very low ppm level of oil is produced in the second stage underflow 10A. This product can be recycled as feed to the first stage units via external piping.

With some production techniques and mature oil wells, production fluids are obtained having high water contents (over 90% by volume) and containing significant amounts of 10% by weight of solids. These fluids typically contain in the order of 5% by volume of oil. It is desirable to remove the bulk of the solids from the fluids and also produce an oil rich stream. Since the quality of produced water is not as important in this application, the two hydrocyclone stages may be optimized to concentrate the oil phase in the fluids.

For this operation, production fluid is fed into the first stage feed chamber 10C at a pressure in the order of 100 to 140 psig. The first stage hydrocyclone 25A is provided with a relatively large overflow orifice in the order of 2.5 to 3.5 mm and solids removal attachments are also included as described in U.S. Pat. No. 5,858,237. As a result, the bulk of the solids in the fluid is separated and removed into the heating chamber 10D, where a stream of hot water flushes the solids out the vessel. Two solids free streams, oil enriched overflow (10 to 30% oil) and produced water underflow (ppm to 1% oil) are produced and collected in appropriate chambers. An additional supporting plate is added to create a first stage underflow chamber. The produced water is fed to downstream separation units or recycled and reused in the production process. The enriched oil (at 30 to 60 psig) is fed to a booster pump to retain feed pressure required for second stage treatment.

The pressure first-stage overflow stream is fed into the second stage feed chamber and enters the second stage hydrocyclone unit. The second stage hydrocyclone unit is equipped with an overflow orifice having a diameter of 1.5 to 2.5 mm depending on feed concentration. No solid removal attachment is necessary in this stage since the oil-rich stream is already solids free. An overflow stream of concentrated oil of 60 to 80% is produced with an underflow stream of dirty water of about 5% oil. The concentrated oil stream collected in the second stage overflow chamber contains no free water and can be treated in dehydration hydrocyclones or other separation equipment to remove the remaining emulsified water. The dirty water can be recycled to the first stage treatment and rejoin the production fluid feed stream for oil recovery.

What is claimed is:

1. A two-stage cyclone separator, each separator stage comprising a generally cylindrical first portion with an open end and a closed end, a generally axial overflow outlet in said closed end, at least two radially balanced feed injection ports in said cylindrical first portion adjacent the closed end thereof, at least one converging tapered intermediate portion with open ends axially flow connected to the open end of the cylindrical first portion, and an outer generally cylindrical portion axially flow connected to said tapered third portion, characterized by a horizontally elongated pressure vessel having at least five chambers separated from each other by divider walls, a first stage hydrocyclone extending through at least one divider wall between a feed inlet chamber and a first stage underflow chamber and having the axial overflow outlet flow connected to an opening through a further divider wall into a first stage overflow chamber, and a second stage hydrocyclone extending through at least three divider walls between said first stage underflow chamber and a second stage underflow chamber, said second stage hydrocyclone having the axial overflow outlet thereof flow connected to an opening through a divider wall into a second stage overflow chamber.

2. A separator according to claim 1, which also includes a heating chamber located between the first stage feed inlet chamber and the first stage underflow chamber.

3. A separator according to claim 1, which includes inlet means for feeding a liquid under pressure into the first stage feed inlet chamber.

4. A separator according to claim 3, which includes a booster pump for increasing the pressure of liquid feeding into the second stage hydrocyclone.

5. A separator according to claim 2, wherein the first stage hydrocyclone includes as solids removal stage located within the heating chamber.

6. A separator according to claim 1, wherein the pressure vessel comprises six adjacent chambers separated by five divider walls, the chambers sequentially comprising (a) a second stage underflow chamber, (b) a first stage overflow chamber, (c) a first stage feed chamber, (d) a heating chamber, (e) a first stage underflow/second stage feed chamber and (f) a second stage overflow chamber.

7. A separator according to claim 1, comprising a plurality of said first stage hydrocyclones and a plurality of said second stage hydrocyclones mounted within said elongated pressure vessel.

* * * * *